Jan. 28, 1930.  F. A. SANBORN  1,744,804
WELDING APPARATUS
Filed Oct. 3, 1927
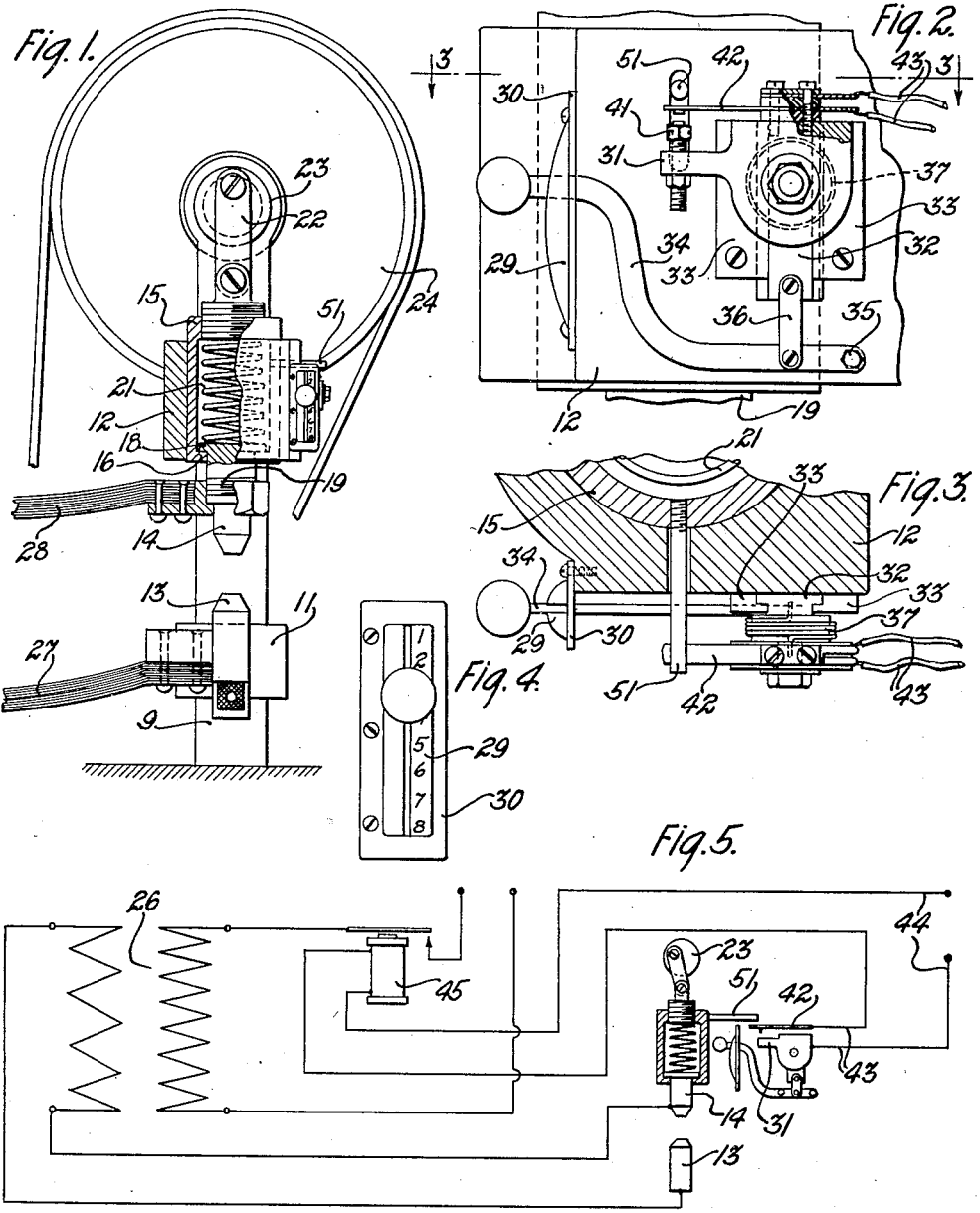
Inventor
Francis A. Sanborn
by H. A. Patterson Att'y.

Patented Jan. 28, 1930

1,744,804

UNITED STATES PATENT OFFICE

FRANCIS ALBERT SANBORN, OF LA GRANGE, ILLINOIS, ASSIGNOR TO WESTERN ELECTRIC COMPANY, INCORPORATED, OF NEW YORK, N. Y., A CORPORATION OF NEW YORK

WELDING APPARATUS

Application filed October 3, 1927. Serial No. 223,623.

This invention relates to a welding apparatus, and more particularly to an apparatus for spot welding various kinds of materials.

In welding materials such as sheet metals, the time required to produce a satisfactory weld depends upon the thickness of the sheets to be welded and also upon the kind of material in the sheet. It is an object of the present invention to provide an electrical apparatus for spot welding in which the time during which the welding current is applied may be conveniently and effectively varied.

The invention contemplates the provision of a welding apparatus driven at a constant speed in which a reciprocating element causes the electrodes to engage the work at regular intervals to produce a series of welds and having means for determining the interval during which the welding current is applied in forming each weld when the electrodes are in engagement with the work.

It is believed that a complete understanding of the invention may be had by reference to the following description taken in conjunction with the accompanying drawing, in which Fig. 1 is a fragmentary side elevation showing the welding apparatus;

Fig. 2 is an enlarged side view of the timing mechanism;

Fig. 3 is a sectional plan view taken on line 3—3 of Fig. 2;

Fig. 4 is an enlarged front elevation of the device for indicating the interval during which the current is applied to the work;

Fig. 5 is a diagrammatic view of the welding circuit, and

Fig. 6 is a graphic representation of various time intervals during which the welding current may be applied.

Referring to the drawings in which the same reference characters designate similar parts in the several views, a welding apparatus is shown mounted on a vertical column 9. Extending forwardly from the vertical column 9 are a pair of arms 11 and 12 upon which electrodes 13 and 14 are mounted. The lower arm 11 may be adjusted vertically upon the column 9 in order to accommodate materials of various thicknesses between the electrodes. The arm 12 is provided with a cylindrical cavity in which a hollow cylindrical reciprocating member 15 is slidably mounted. The lower end of the cylindrical reciprocating member is provided with an inwardly extending flange 16 against which the head 18 of the electrode holder 19 in which the electrode 14 is secured, is resiliently held by means of a coil spring 21 so that when the electrode 14 comes in contact with the work the reciprocating member 15 may complete its stroke and the electrode 14 and holder 19 will enter the cylindrical cavity of the reciprocating member 15. A link 22 is pivotally connected to the upper end of the reciprocating member 15 and the other end of the link is pivotally and eccentrically mounted upon a wheel 23 which is driven by a fly wheel 24 operated by any suitable source of constant speed power. Upon each revolution of the wheel 23 the electrodes will be brought in contact with the materials to be welded and a current will be supplied to the electrodes through the flexible leads 27 and 28 from the transformer 26 to produce a weld.

The mechanism for timing the duration of the application of the current comprises a horizontal arm 31 pivotally mounted upon a vertically slidable member 32 which forms a slidable rabbeted joint with the stationary pieces 33—33 attached to the side of the arm 12. The arm 31 may be adjusted in its vertical position to vary the time during which the welding current is applied by means of a lever 34 pivoted at 35 which is connected to the slidable member 32 by means of a link 36. The forward end of the lever 34 extends through a slotted indicating member 29 attached to the arm 12 by means of a bracket 30. The indicating member may be calibrated in fractions of a second to indicate the interval during which the welding current is applied. The arm 31 is yieldably held in a horizontal position by means of a coil spring 37. Mounted upon the arm 31 and insulated therefrom is a spring 42 which is adapted to make contact with the adjustable contact member 41 carried by the end of the arm 31. The contact spring 42 and contact 41 are connected in a control circuit 44 through leads 43 which includes a relay 45 for controlling the energization of the primary of the transformer 26 and which may be energized from any suitable source of current (not shown). The spring 42 and contact member 41 are located in the path of a pin 51 which is carried by the reciprocating member 15. When the pin 51 comes in contact with the spring 42 the latter will yield until it comes in contact with the contact member 41 closing the control circuit 44 whereupon the arm 31 which is yieldably held in a horizontal position by means of the spring 37 will be tilted from its horizontal position during the remainder of the stroke of the reciprocating member 15 and the control circuit 44 will be closed until the arm 31 is returned to its horizontal position and the spring 42 released from contact with the contact member 41 by the withdrawal of the pin 51.

Fig. 6 graphically shows the period of application of the welding current to the work. The circles 55 represent a welding cycle which corresponds to one complete revolution of the wheel 23. The lengths of the arrows 56 indicate that portion of the cycle or revolution of the wheel 23 during which the current may be applied.

The operation of the apparatus is as follows: The lower electrode 13 is adjusted by adjusting the arm 11 on the vertical column 9 in accordance with the thickness of the material in which a series of welds is to be produced. This adjustment should be such that the electrode 14 will come in contact and exert a pressure between the parts to be welded before the welding current is applied. The lever 34 is then moved so as to place the timing mechanism in such a position that immediately after the electrode 14 comes in contact with the work the pin 51, carried by the reciprocating member 15, will strike the spring 42 and close the control circuit 44 energizing the relay 45 to close the circuit through the primary of the transformer 26 which may be energized from any suitable source of current (not shown) causing a welding current to flow through the electrodes 13 and 14 to form a weld. When the reciprocating member 15 has again reached the position in which the pin 51 will be withdrawn from the contact spring 42 the control circuit 44 will be opened to release the relay 45 and thereby disconnect the source of welding current. After the welding current is interrupted the electrode 14 will be withdrawn from the work permitting the work to be shifted to another position where another weld may be formed in a similar manner. By providing indicia on the member 30 the lever 34 may be accurately set prior to the welding operation to predetermine the period of application of the welding current in accordance with the character of the material being welded, that is, for material of a given thickness it is necessary to apply the current for a certain period, which period might, of course, vary with materials of different composition.

The apparatus disclosed may be used to advantage in connection with the manufacture of metal shells or boxes wherein the material in the form of long sheet is fed from a roll of the material between forming rolls which form the material into a continuous rectangular shell. The seam of the shell is disposed in the center of the upper rectangular wall of the shell and the lower electrode is mounted on an arm which enters the rectangle at a point preceding the rolls which produce the overlapping of the edges of the seam and supports the electrode at a point where the seam is to be welded. The upper reciprocating electrode then cooperates with the lower electrode to form a series of welds producing a continuous rectangular tube which may be cut into lengths suitable for making boxes by providing them with ends.

It will be understood that the invention herein described and illustrated is merely a useful and convenient form of the invention which is capable of many other modifications without departing from the spirit and scope of the invention.

What is claimed is:

1. In a welding apparatus, a control circuit, and a timing mechanism in the control circuit comprising a reciprocating member, an arm extending into the path of the reciprocating member, means closing the control circuit when the arm is tilted by the reciprocating member, and means for controlling the point of engagement between the reciprocating member and the arm to vary the time during which the control circuit is closed.

2. In a welding apparatus, a control circuit, and a timing mechanism in the control circuit comprising a reciprocating member, an arm perpendicular to the path and extending into the path of the reciprocating member, means for closing the circuit when the arm is moved from its perpendicular position, and means for shifting the normal position of the arm parallel to and along the path of the reciprocating member to vary the interval during which the circuit is closed.

3. In a welding apparatus, a welding circuit, and means for controlling the operation of the welding-circuit, comprising an arm, a pivot for supporting the arm, adjustable means for changing the location of the pivot, means for normally retaining the arm in a predetermined angular position on said pivot, and means for operating the welding circuit when the arm is moved from said angular position.

4. In a welding apparatus, a welding circuit, and means for controlling the welding circuit, comprising an arm, a pivot for supporting said arm, means for normally retaining the arm in a predetermined angular position on said pivot, means for operating the welding circuit when the arm is moved from said angular position, and means for shifting the pivot to vary the interval during which the welding circuit is operative.

5. In a welding apparatus, a welding circuit, means for causing a welding current to flow in the welding circuit for a predetermined period, and means for indicating the period during which the welding current flows.

6. In a welding apparatus, a welding circuit, means for causing a welding current to flow in the welding circuit for a predetermined period, means for varying the period during which the welding current flows, and means for indicating the period during which the welding current flows.

7. In a welding apparatus, a control circuit, a device for causing an operating current to flow therein, and means for controlling said device to vary the time of closing and opening the control circuit.

In witness whereof, I hereunto subscribe my name this 22nd day of September A. D., 1927.

FRANCIS ALBERT SANBORN.